(12) United States Patent
Villaron

(10) Patent No.: US 11,514,399 B2
(45) Date of Patent: Nov. 29, 2022

(54) AUTHORING THROUGH SUGGESTION

(71) Applicant: Microsoft Technology Licensing, LLC, Redmond, WA (US)

(72) Inventor: Shawn Villaron, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 563 days.

(21) Appl. No.: 14/578,461

(22) Filed: Dec. 21, 2014

(65) Prior Publication Data

US 2015/0177925 A1 Jun. 25, 2015

Related U.S. Application Data

(60) Provisional application No. 61/919,714, filed on Dec. 21, 2013.

(51) Int. Cl.
*G06F 3/0482* (2013.01)
*G06Q 10/10* (2012.01)

(52) U.S. Cl.
CPC ........... *G06Q 10/10* (2013.01); *G06F 3/0482* (2013.01); *G06Q 10/101* (2013.01)

(58) Field of Classification Search
CPC . G06F 3/048–04886; G06F 17/20–218; G06F 17/24–248
See application file for complete search history.

(56) References Cited

U.S. PATENT DOCUMENTS

| 6,021,403 | A  | * | 2/2000 | Horvitz | G06F 9/453 706/45 |
| 6,262,730 | B1 | * | 7/2001 | Horvitz | G06F 9/4446 715/707 |
| 6,366,923 | B1 |   | 4/2002 | Lenk et al. | |
| 6,553,358 | B1 | * | 4/2003 | Horvitz | G06Q 20/10 706/45 |
| 6,732,090 | B2 |   | 5/2004 | Shanahan et al. | |

(Continued)

FOREIGN PATENT DOCUMENTS

| CN | 101454774 A | 6/2009 |
| CN | 101542473 A | 9/2009 |

(Continued)

OTHER PUBLICATIONS

"International Search Report & Written Opinion Issued in PCT Patent Application No. PCT/US2014/033906", dated Sep. 8, 2014, 9 Pages.

(Continued)

*Primary Examiner* — Linda Huynh

(57) ABSTRACT

Technologies are generally provided for creating content by detecting user intent and providing suggestions associated with content actions. User intent may be determined from a number of different factors associated with the user, a document, and an environment of the user and/or content. Suggestions on content actions such as placement, style, formatting, or extent of content may be automatically made to the user. Suggestions may also be provided based on other factors such as crowd sourcing. In addition to automatic emphasis and connection, content transformation may be enabled prior to consumption after the author has created the content.

20 Claims, 8 Drawing Sheets

(56) References Cited

U.S. PATENT DOCUMENTS

| | | | |
|---|---|---|---|
| 7,149,970 B1 | 12/2006 | Pratley et al. | |
| 7,509,345 B2 | 3/2009 | DeSpain et al. | |
| 7,519,573 B2 | 4/2009 | Helfman et al. | |
| 7,623,710 B2* | 11/2009 | Simard | G06V 30/40 |
| | | | 382/175 |
| 7,933,952 B2 | 4/2011 | Parker et al. | |
| 7,962,853 B2 | 6/2011 | Bedi et al. | |
| 8,032,470 B1* | 10/2011 | Heidenreich | G06N 5/04 |
| | | | 706/45 |
| 8,073,811 B2 | 12/2011 | Strathearn et al. | |
| 8,229,795 B1 | 7/2012 | Myslinski | |
| 8,239,455 B2 | 8/2012 | Wang | |
| 8,290,772 B1 | 10/2012 | Cohen et al. | |
| 8,464,150 B2 | 6/2013 | Davidson et al. | |
| 8,825,758 B2 | 9/2014 | Bailor et al. | |
| 8,832,188 B1 | 9/2014 | Cierniak | |
| 9,183,172 B1* | 11/2015 | Anderson | H04N 21/4788 |
| 9,553,902 B1* | 1/2017 | Cherukuri | G06F 40/166 |
| 9,715,476 B2 | 7/2017 | Megiddo et al. | |
| 2004/0085354 A1 | 5/2004 | Massand | |
| 2006/0026502 A1 | 2/2006 | Dutta | |
| 2006/0041589 A1 | 2/2006 | Helfman et al. | |
| 2006/0075353 A1 | 4/2006 | Despain et al. | |
| 2006/0248071 A1 | 11/2006 | Campbell et al. | |
| 2007/0106952 A1 | 5/2007 | Matas et al. | |
| 2007/0220480 A1 | 9/2007 | Waldman et al. | |
| 2008/0059539 A1 | 3/2008 | Chin et al. | |
| 2008/0098294 A1 | 4/2008 | Le | |
| 2008/0104061 A1 | 5/2008 | Rezaei | |
| 2009/0157811 A1 | 6/2009 | Bailor et al. | |
| 2009/0164394 A1* | 6/2009 | Multerer | G06Q 10/10 |
| | | | 706/12 |
| 2009/0271696 A1 | 10/2009 | Bailor et al. | |
| 2010/0004944 A1 | 1/2010 | Palaniappan | |
| 2010/0106703 A1 | 4/2010 | Cramer | |
| 2010/0235763 A1* | 9/2010 | Massand | G06F 40/131 |
| | | | 715/753 |
| 2010/0257457 A1 | 10/2010 | De Goes | |
| 2010/0325016 A1 | 12/2010 | Marcus et al. | |
| 2011/0022662 A1 | 1/2011 | Barber-mingo et al. | |
| 2011/0208822 A1 | 8/2011 | Rathod | |
| 2011/0213655 A1 | 9/2011 | Henkin et al. | |
| 2012/0023418 A1 | 1/2012 | Frields et al. | |
| 2012/0060098 A1 | 3/2012 | Libin et al. | |
| 2012/0117463 A1* | 5/2012 | Inglis | G06F 40/58 |
| | | | 715/255 |
| 2012/0144316 A1* | 6/2012 | Deng | G06Q 30/02 |
| | | | 715/751 |
| 2012/0233543 A1 | 9/2012 | Vagell et al. | |
| 2012/0245996 A1 | 9/2012 | Mendez et al. | |
| 2012/0246719 A1* | 9/2012 | Bhamidipaty | H04L 63/1408 |
| | | | 726/22 |
| 2012/0260155 A1 | 10/2012 | Krieger et al. | |
| 2012/0278401 A1* | 11/2012 | Meisels | G06F 17/24 |
| | | | 709/206 |
| 2012/0284344 A1* | 11/2012 | Costenaro | G06F 17/241 |
| | | | 709/206 |
| 2012/0331057 A1 | 12/2012 | Rothschild | |
| 2013/0179515 A1 | 7/2013 | Chi et al. | |
| 2013/0218845 A1 | 8/2013 | Kleppner et al. | |
| 2013/0268849 A1* | 10/2013 | Du | G06Q 10/10 |
| | | | 715/255 |
| 2013/0275892 A1* | 10/2013 | Li | G06F 3/04817 |
| | | | 715/762 |
| 2013/0283147 A1 | 10/2013 | Wong et al. | |
| 2013/0311329 A1 | 11/2013 | Knudson et al. | |
| 2014/0033068 A1 | 1/2014 | Gupta et al. | |
| 2014/0149857 A1* | 5/2014 | Vagell | G06F 40/169 |
| | | | 715/255 |
| 2014/0195899 A1 | 7/2014 | Bastide et al. | |
| 2014/0201623 A1 | 7/2014 | Kattner et al. | |
| 2014/0233919 A1 | 8/2014 | Sabatino | |
| 2014/0281875 A1 | 9/2014 | Branton et al. | |
| 2014/0281951 A1 | 9/2014 | Megiddo et al. | |
| 2014/0289645 A1 | 9/2014 | Megiddo et al. | |
| 2014/0310613 A1 | 10/2014 | Megiddo et al. | |
| 2014/0365207 A1* | 12/2014 | Convertino | G06F 17/2785 |
| | | | 704/9 |
| 2015/0074516 A1* | 3/2015 | Ben-Aharon | G06F 17/2247 |
| | | | 715/234 |
| 2015/0113390 A1* | 4/2015 | Vagell | G06F 17/24 |
| | | | 715/255 |
| 2015/0178391 A1 | 6/2015 | Villaron | |
| 2015/0180966 A1 | 6/2015 | Villaron | |
| 2016/0110029 A1 | 4/2016 | Megiddo et al. | |
| 2019/0339819 A1 | 11/2019 | Megiddo et al. | |

FOREIGN PATENT DOCUMENTS

| | | |
|---|---|---|
| CN | 102945226 A | 2/2013 |
| EP | 1548611 A2 | 6/2005 |

OTHER PUBLICATIONS

Halder, Soumen, "Memonic: A Web Clipping Tool to Capture and Share Web Content", Retrieved from: https://www.maketecheasier.com/memonic-web-clipping-tool-to-share-web-content/, Published on Jul. 17, 2010, 10 Pages.

Hickey, Kasey Fleisher, "Did You Know: How to Clip Web Content", Retrieved from: https://web.archive.org/web/20121225122430/https://blog.evernote.com/blog/2011/05/13/did-you-know-how-to-clip-web-content/, Published on May 13, 2011, 6 Pages.

"VisualCV: Dynamic Web Resume Builder", Retrieved from: http://web.archive.org/web/20090426064510/http://www.makeuseof.com/dir/visualcv/, Retrieved on Apr. 23, 2009, 4 Pages.

"International Preliminary Report on Patentability Issued in PCT Application No. PCT/US2014/031144", dated Jul. 8, 2015, 8 Pages.

"Second Written Opinion Issued in PCT Application No. PCT/US2014/033906", dated Mar. 6, 2015, 5 Pages.

"International Preliminary Report on Patentability Issued in PCT Patent Application No. PCT/US2014/033906", dated Apr. 17, 2015, 6 Pages.

"Non-final Office Action Issued in U.S. Appl. No. 13/863,323", dated Feb. 27, 2015, 14 Pages.

"Final Office Action Issued in U.S. Appl. No. 13/863,323", dated Aug. 27, 2015, 14 Pages.

"Second Written Opinion Issued in PCT Application No. PCT/US2014/031144", dated Feb. 4, 2015, 5 Pages.

"International Search Report and Written Opinion Issued in PCT Application No. PCT/US2014/031144", dated Jul. 1, 2014, 11 Pages.

"Non-Final Office Action Issued in U.S. Appl. No. 13/848,027", dated Jun. 1, 2015, 13 Pages.

Parr, et al., "Google Docs Improves Commenting, Adds E-mail Notifications", Retrieved from: http://mashable.com/2011/03/16/google-docs-discussions/, Mar. 16, 2011, 6 Pages.

"Overview of co-authoring in SharePoint 2013", Retrieved from: http://technet.microsoft.com/en-us/library/ff718249.aspx, Jan. 15, 2013, 6 Pages.

"Office Action Issued in European Patent Application No. 14725859.4", dated Jul. 21, 2016, 3 Pages.

"First Office Action and Search Report Issued in Chinese Patent Application No. 201480016449.5", dated Feb. 15, 2017, 18 Pages.

"Office action Issued In European Patent Application No. 14725859.4", dated Feb. 8, 2018, 4 Pages.

"Office action Issued In Chinese Patent Application No. 201480021498.8", dated Feb. 5, 2018, 9 Pages.

"Non-Final Office Action Issued in U.S. Appl. No. 13/863,323", dated Jul. 29, 2016, 14 Pages.

"Final Office Action Issued in U.S. Appl. No. 13/863,323", dated Feb. 9, 2017, 15 Pages.

"Non-Final Office Action Issued in U.S. Appl. No. 13/860,127", dated Sep. 21, 2016, 22 Pages.

"Non-Final Office Action Issued in U.S. Appl. No. 13/860,127", dated Jun. 12, 2015, 18 Pages.

"Final Office Action Issued in U.S. Appl. No. 13/860,127", dated Dec. 16, 2015, 24 Pages.

(56) References Cited

OTHER PUBLICATIONS

"Final Office Action Issued in U.S. Appl. No. 14/578,464", dated Jul. 19, 2017, 14 Pages.
"Non-Final Office Action Issued In U.S. Appl. No. 14/578,464", dated Dec. 22, 2017, 19 Pages.
"Non-Final Office Action Issued In U.S. Appl. No. 14/578,464", dated Feb. 22, 2017, 16 Pages.
"Final Office Action Issued in U.S. Appl. No. 13/827,196", dated Sep. 25, 2015, 30 Pages.
"Final Office Action Issued in U.S. Appl. No. 13/827,196", dated Apr. 5, 2016, 33 Pages.
"Final Office Action Issued in U.S. Appl. No. 13/827,196", dated Feb. 22, 2017, 39 Pages.
"Office Action Issued In U.S. Appl. No. 13/827,196", dated Dec. 11, 2015, 31 Pages.
"Office Action Issued In U.S. Appl. No. 13/827,196", dated Oct. 5, 2016, 32 Pages.
"Office Action Issued In U.S. Appl. No. 13/827,196", dated Apr. 1, 2015, 28 Pages.
"Collaborating In Really Real-Time", Retrieved from: http://etherpad.org/, Retrieved Date: Feb. 6, 2013, 4 Pages.
Rigsby, Josette, "Microsoft Add Real-Time Collaboration to Office Web Application", http://www.cmswire.com/cms/enterprise-collaboration/microsoft-add-realtime-collaboration-to-office-web-application-011945.php, 3 Pages.
W3schools, "CSS Reference", http://www.w3schools.com/cssref/default.asp, 8 Pages.
Mahlow, et al., "Linguistic Support for Revising and Editing", In Proceedings of the 9th International Conference on Computational Linguistics and Intelligent Text Processing, Feb. 17, 2008, 14 Pages.
"Non-final Office Action Issued In U.S. Appl. No. 14/578,466", dated Apr. 25, 2018, 17 Pages.
"Non-final Office Action Issued In U.S. Appl. No. 14/578,466", dated Mar. 23, 2017, 19 Pages.
"Final Office Action Issued In U.S. Appl. No. 14/578,466", dated Oct. 2, 2017, 21 Pages.
Miller, et al., "LAPIS: Smart Editing with Text Structure", In Extended Abstracts on Human Factors in Computing Systems, Apr. 20, 2002, 2 Pages.
"Office action Issued In U.S. Appl. No. 14/981,974", dated Nov. 2, 2017, 19 Pages.
"Office action Issued In U.S. Appl. No. 14/981,974", dated Mar. 15, 2018, 20 Pages.
"Office Action Issued in European Patent Application No. 14720011.7", dated May 15, 2018, 6 Pages.
"Non Final Office Action Issued in U.S. Appl. No. 14/981,974", dated Sep. 25, 2018, 20 Pages.
"Final Office Action Issued in U.S. Appl. No. 14/578,464", dated Jul. 11, 2018, 22 Pages.
"Final Office Action Issued in U.S. Appl. No. 14/578,466", dated Dec. 5, 2018, 17 Pages.
"Non Final Office Action Issued in U.S. Appl. No. 14/578,466", dated Jun. 12, 2019, 21 Pages.
"Non Final Office Action Issued in U.S. Appl. No. 14/578,464", dated Jul. 18, 2019, 17 Pages.
"Final Office Action Issued in U.S. Appl. No. 14/578,466", dated Dec. 16, 2019, 16 Pages.
"Final Office Action Issued in U.S. Appl. No. 14/578,464", dated Dec. 26, 2019, 18 Pages.
"Notice of Allowance Issued in U.S. Appl. No. 14/578,464", dated Jun. 24, 2020, 11 Pages.
"Office Action Issued in Indian Patent Application No. 6413/CHENP/2015", dated Apr. 24, 2020, 6 Pages.
"Non Final Office Action Issued in U.S. Appl. No. 16/417,530", dated May 19, 2020, 21 Pages.

\* cited by examiner

AUTHORING THROUGH SUGGESTION

CROSS-REFERENCE TO RELATED APPLICATION

This application claims the benefit under 35 U.S.C § 119 (e) of U.S. Provisional Application Ser. No. 61/919,714 filed on Dec. 21, 2013. The Provisional Application is herein incorporated by reference in its entirety.

BACKGROUND

Content processing applications and services, especially textual content, provide a number of controls for selecting and modifying aspects of content. Content processing applications may modify aspects of content, which include formatting, grammatical, stylistic corrections, and word replacements through synonym/antonym suggestions. In systems, such controls are available individually, independently, and interdependently. Thus, it is possible for users to manually select and modify aspects of content created and/or possessed by the user. Furthermore, creating content to match a particular style (not necessarily formatting, but prose style) is mostly a manual process left to the user in applications. For example, if an organization has a particular preference for not only formatting, but also for choice of words, sentence structure, and similar aspects of documents created by its members, the preference may be a process left to individual users to learn and apply.

SUMMARY

This summary is provided to introduce a selection of concepts in a simplified form that are further described below in the Detailed Description. This summary is not intended to identify features of the claimed subject matter, nor is it intended as an aid in determining the scope of the claimed subject matter.

Examples are directed to enabling users to create content by detecting their intent and providing suggestions associated with content actions. User intent may be determined from a number of different factors associated with the user, a document, and an environment. Then, suggestions on content creation such as placement, style, formatting, and even extent of content may be automatically made to the user. Suggestions may also be provided based on other factors such as crowd sourcing. In addition to automatic emphasis and connection, content transformation may be enabled prior to consumption after the author has created the content.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
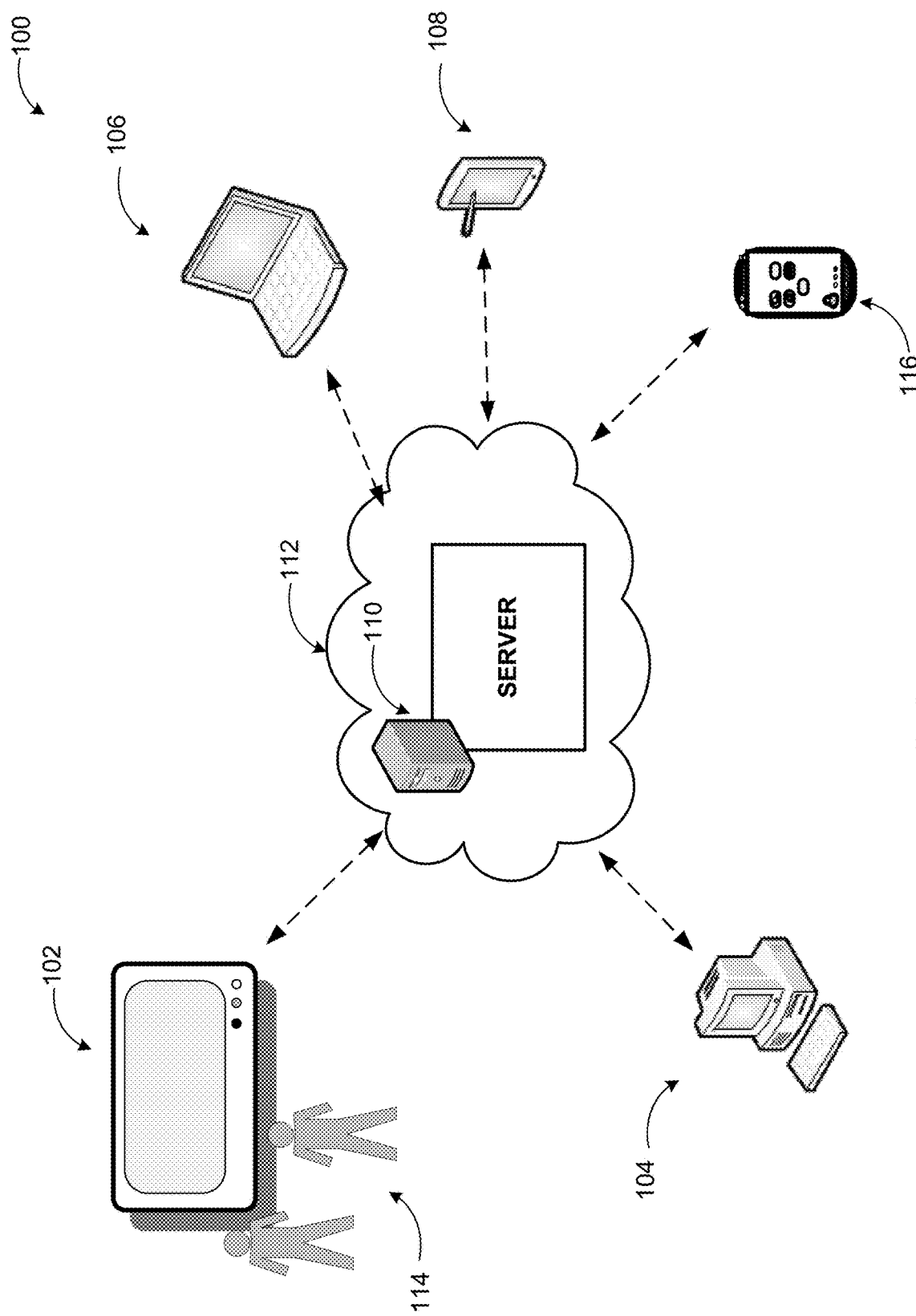
FIG. 1 includes a conceptual diagram illustrating a local and networked configuration environment, where intent based authoring may be implemented.

As briefly described above, users may be enabled to create content by detecting their intent and providing suggestions associated with content actions. User intent may be determined from a number of different factors associated with the user, a document, and an environment. Then, suggestions on content creation such as placement, style, formatting, and extent of content may be automatically made to the user.

An application executed as a locally installed application by a processing unit of a computing device in a local computing environment may provide suggestions associated with author intent. In other examples, the application may be part of a hosted service executed on a server and accessed by client devices through a network. The suggestions provided by the application may increase the efficiency in creation of the content. The suggestions may also enable users to create and process content individually and/or collaboratively. The application may determine author intent based on factors associated with the user that include, for example, the author of the content, the document (including the content) being created, an environment associated with the author and/or the content (i.e. a collaboration environment), and external factors (i.e. crowd-sourcing). Based on the determined intent, the application may provide suggestions for automated content actions that include one or more of: placement, formatting, style selection, relationships between content elements, size and attribute selection for content elements, layout of content elements, animations, transitions, and/or accessibility options. The suggested content actions may be performed upon author selection or automatically. In some examples, suggested content based on the attributes may be displayed to enable the author to view how the suggestion based automatic content creation works. There may be other advantageous uses of the application beyond the ones listed herein.

In the following detailed description, references are made to the accompanying drawings that form a part hereof, and in which are shown by way of illustrations specific examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the examples will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that examples may be practiced with other computer system configurations, including hand-held devices, multiprocessor systems, microprocessor-based or programmable consumer electronics, minicomputers, mainframe computers, and comparable computing devices. Examples may also be practiced in distributed computing environments where tasks are performed by remote processing devices that are linked through a communications network. In a distributed computing environment, program modules may be located in both local and remote memory storage devices.

Examples may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for content creation based on author intent. Examples of platforms include, but are not limited to, a hosted service executed over a plurality of servers, an application executed on a single computing device, and comparable systems. The term "server" generally refers to a computing device executing one or more software programs typically in a networked environment. A server may also be implemented as a virtual server (software programs) executed on one or more computing devices viewed as a server on the network. More detail on these technologies and example operations is provided below.

Referring to FIG. 1, diagram 100 illustrates a local and networked configuration environment, where intent based authoring may be implemented according to some examples. The computing devices and computing environments shown in diagram 100 are for illustration purposes. Examples may be implemented in various local, networked, and similar computing environments employing a variety of computing devices and systems.

Diagram 100 represents a local computing environment in a computing device, where an authoring application may enable one or more users, such as users 114, to create and process content individually or collaboratively. The authoring application may be executed as a locally installed application on a desktop computer 104, a laptop computer 106, a tablet 108, a smart phone 116, a smart whiteboard 102, and similar devices. The authoring application may also be part of a hosted service executed on a server 110 and accessed by client devices through a network 112.

The authoring application may determine author intent based on a number of factors associated with the author, the document (including the content) being created, the environment associated with the author and/or the content (i.e., the collaboration environment), and external factors (i.e. crowd-sourcing). Based on the determined intent, the authoring application may provide suggestions for automated content actions, that may include one or more of: as placement, formatting, style selection, relationships between content elements, size and attribute selection for content elements, layout of content elements, animations, transitions, and/or accessibility options. The suggested content actions may be performed upon author selection or automatically. In some examples, the suggested content based on the above attributes may be displayed to enabled the author view how the suggestion based automatic content creation works.

The authoring application may be a word processing application, a presentation application, a spreadsheet application, a note taking application, a collaboration application with a content editing module, and comparable ones.

The example systems in FIG. 1 have been described with specific servers, client devices, applications, and interactions. Examples are not limited to systems according to these example configurations. A platform providing intent based authoring may be implemented in configurations employing fewer or additional components and performing other tasks. Furthermore, specific protocols and/or interfaces may be implemented in a similar manner using the principles described herein.

Figure 2:
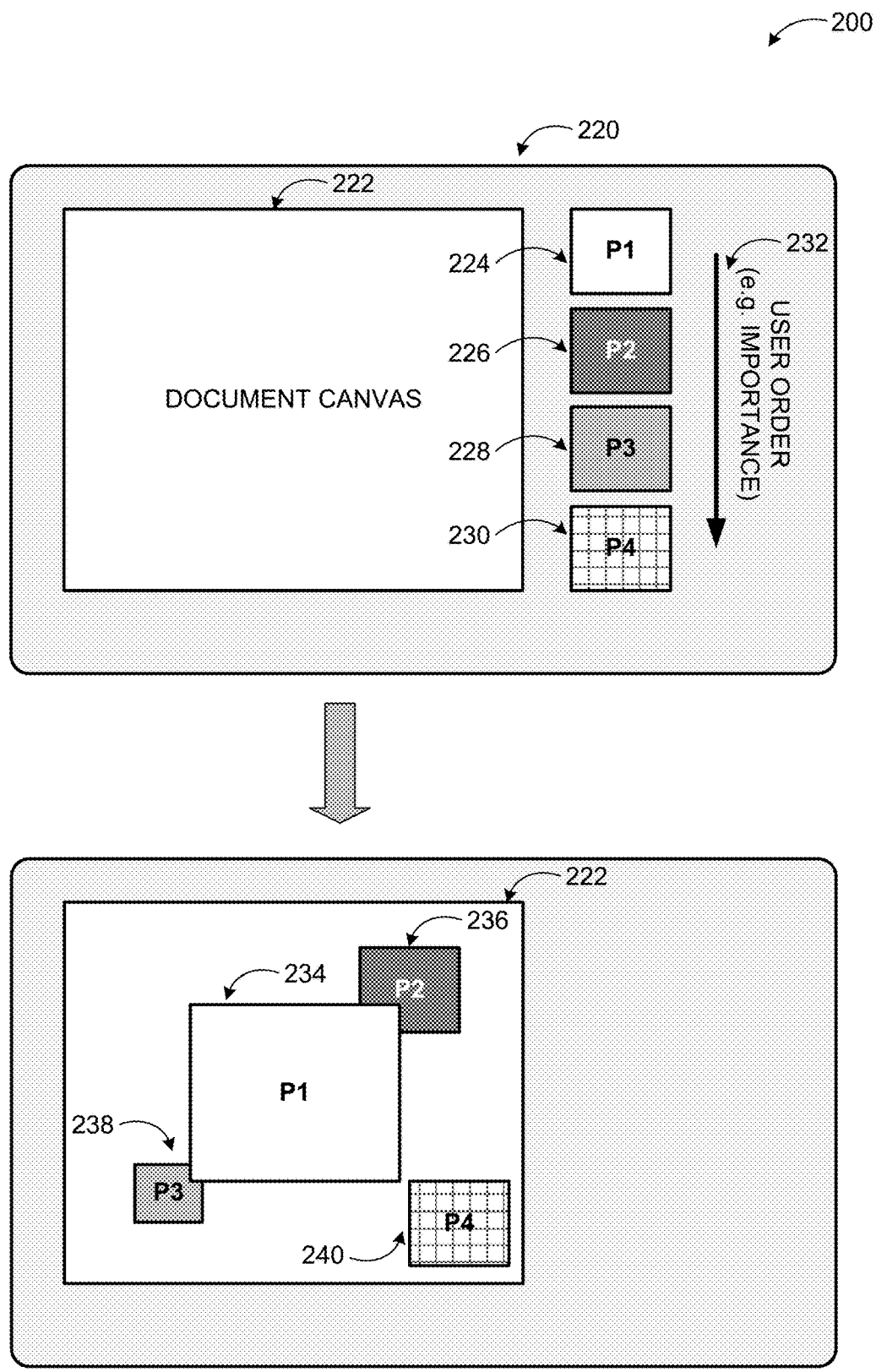
FIG. 2 illustrates an example content placement action based on author intent according to examples.

Referring to FIG. 2, diagram 200 illustrates an example content placement action based on author intent according to examples. Created or modified content according to examples may include text, images, graphics, and/or embedded objects such as audio or video objects.

In some examples, the author intent may be determined from one or more author attributes that include one or more of: an organizational position, a professional status, an identity, and/or a social status. The author attribute may be determined from the author's sign-on credentials, a computing device used to execute or access the authoring application, or comparable methods. A document context, such as a storage location (i.e., a cloud) for the content, related documents, prior versions, etc. may also be used to determine the author intent. Furthermore, collaboration information such as identities/attributes of the collaborators, a type of the collaboration project, and similar factors may also be considered.

Moreover, the document attribute, such as one or more of: a type of the document containing the content, one or more restrictions imposed on the document, modifications to the document, and so on, may also be used to determine the author intent. In other examples, the author intent may be further determined from trends in the Internet, trends among peers, and/or organizational norms. Another factor that may be considered in determining the author intent may be a type of computing device used by the author such as a mobile device, a laptop device, a desktop computer, and comparable ones.

Once the author intent is determined, content actions may be identified based on the author intent. The content actions may include decisions on placement of content, formatting of content, style of content, relationships between content elements, sizing of content/content elements, layout of content elements, animations associated with content elements, motion paths for animated content elements, and or accessibility options (i.e., visual impairedness, readable text, etc.). These actions may be determined and automatically decided based on determined author intent.

In some examples, the content actions may include replacement of portions of the content. For example, images may be replaced with textual portions and vice versa or same type of portions (text, image, graphics, etc.) may be switched to emphasize the determined author intent. In addition, attributes of content elements such as font type, font size, boldness, etc. of textual content; frame type, size, shading of an image, thickness of lines, colors, and so on may be selected to emphasize the author intent and/or what is determined to be a theme of the created content. For example, upon determining the theme of the content, one or more sentences within the content summarizing or representing that theme may be bolded or italicized. Similarly, a title or header may be created and suitably placed based on the determined theme of the content.

Diagram 200 shows one example for content creation based on author intent. According to the example scenario, content elements P1 through P4 (224, 226, 228, 230), which may be selected by the author or through other means (i.e., automatic suggestion), may be displayed in an order 232 according to their importance to the author (determined based on author intent as discussed above) adjacent to a document canvas 222 on a computing device user interface 220.

In some examples, the author may order the content elements (i.e., pictures) and the authoring application may determine each content element's importance to the author based on the type of content (i.e., a photo album) being created by the author. Then, the authoring application may place the content elements on the document canvas 222 as content elements 234, 236, 238, and 240. As shown in the example configuration, content element 234 may be placed in the middle as the dominant element and a size of the content element 234 may be enlarged to emphasize an importance of the content element 234 to the author. Content elements 236 and 238 may be placed in an overlap position and behind the content element 234 with sizes of the content elements 236 and 238 adjusted too. Content element 240 may not be in the same group as the content elements 234, 236, and 238. Thus, content element 240 may be placed separately from the other three.

An authoring application according to examples may be part of a hosted service and accessed by the user through a thin or thick client application such as a browser. The authoring application may also be a locally installed and executed application.

Figure 3:
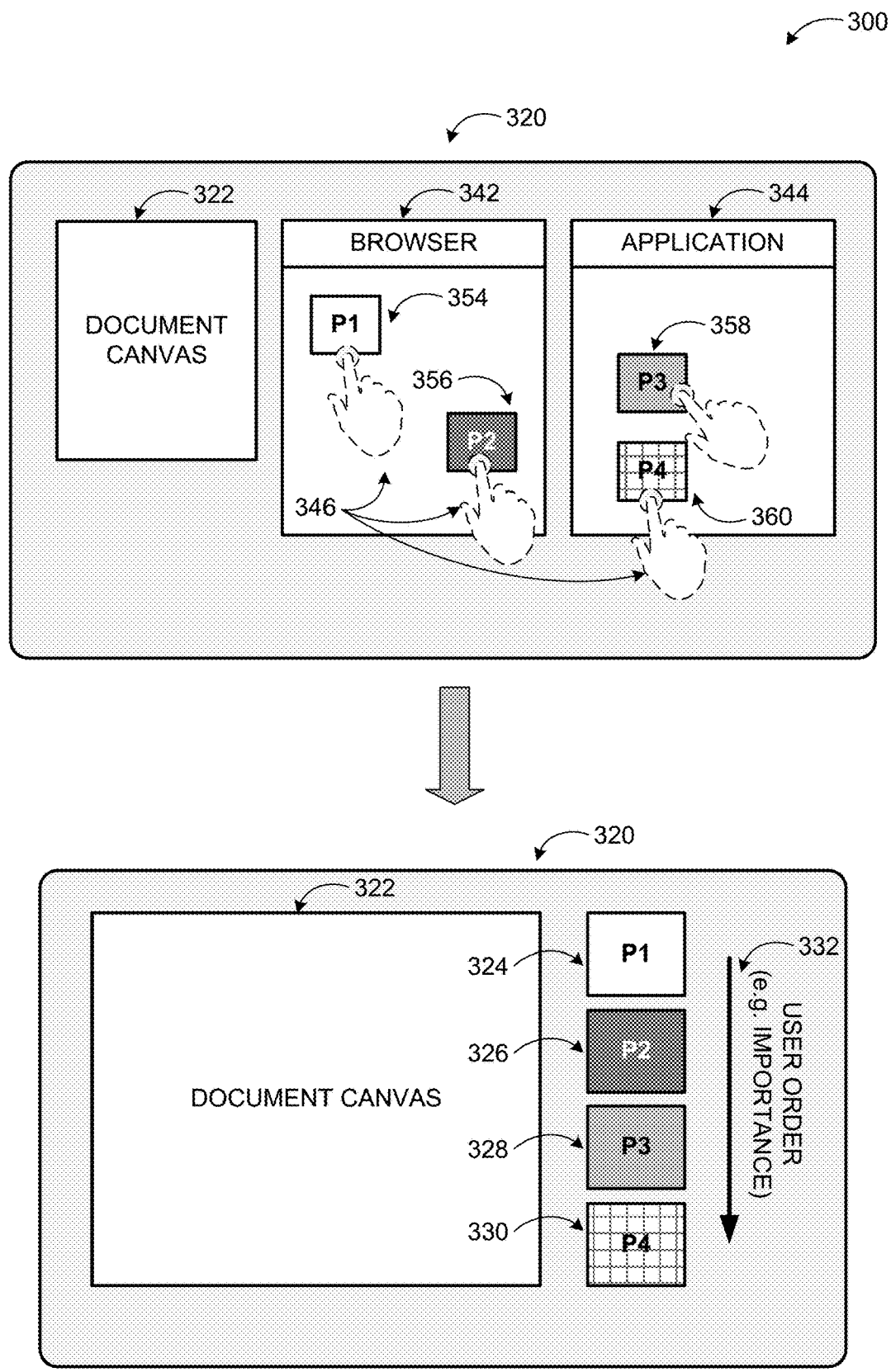
FIG. 3 illustrates an example for content selection and suggestion according to some examples.

Referring to FIG. 3, diagram 300 illustrates an example for content selection and suggestion according to some examples.

In some examples, the author may be enabled to select content elements on a computing device 320 from one or more application user interfaces, such as a document canvas 322, a browser 342, and an application 344. The selections may be intended to be placed on the document canvas 322. Upon detecting of selection (346) of content elements 354 and 356 on browser 342 and content elements 358 and 360 on application 344, the authoring application may automatically order (332) the content elements as ordered content elements 324, 326, 328, and 330 adjacent to document canvas 322. The author may then confirm the order and initiate the automatic placement as discussed above in conjunction with FIG. 2.

In other examples, the content elements may be selected automatically in response to detecting an author interest (i.e., author hovering on the content elements) and displayed in the ordered fashion for the author to select/confirm the selection and/or order. In yet other examples, the ordered content elements 324, 326, 328, and 330 may be displayed in suggested format/style to provide the author a preview of how they would look when placed on the document canvas 322. Thus, content actions may be suggested (displayed) in an implemented mode such that the author views each content action as performed.

In further examples, a theme of the content may be determined and at least one portion of the content may be emphasized based on the determined theme employing one or more of a textual scheme, a graphic scheme, a shading scheme, a placement scheme, and/or a color scheme. Furthermore, a learning algorithm may be employed to dynamically adjust intent determination and content action identification.

Figure 4:
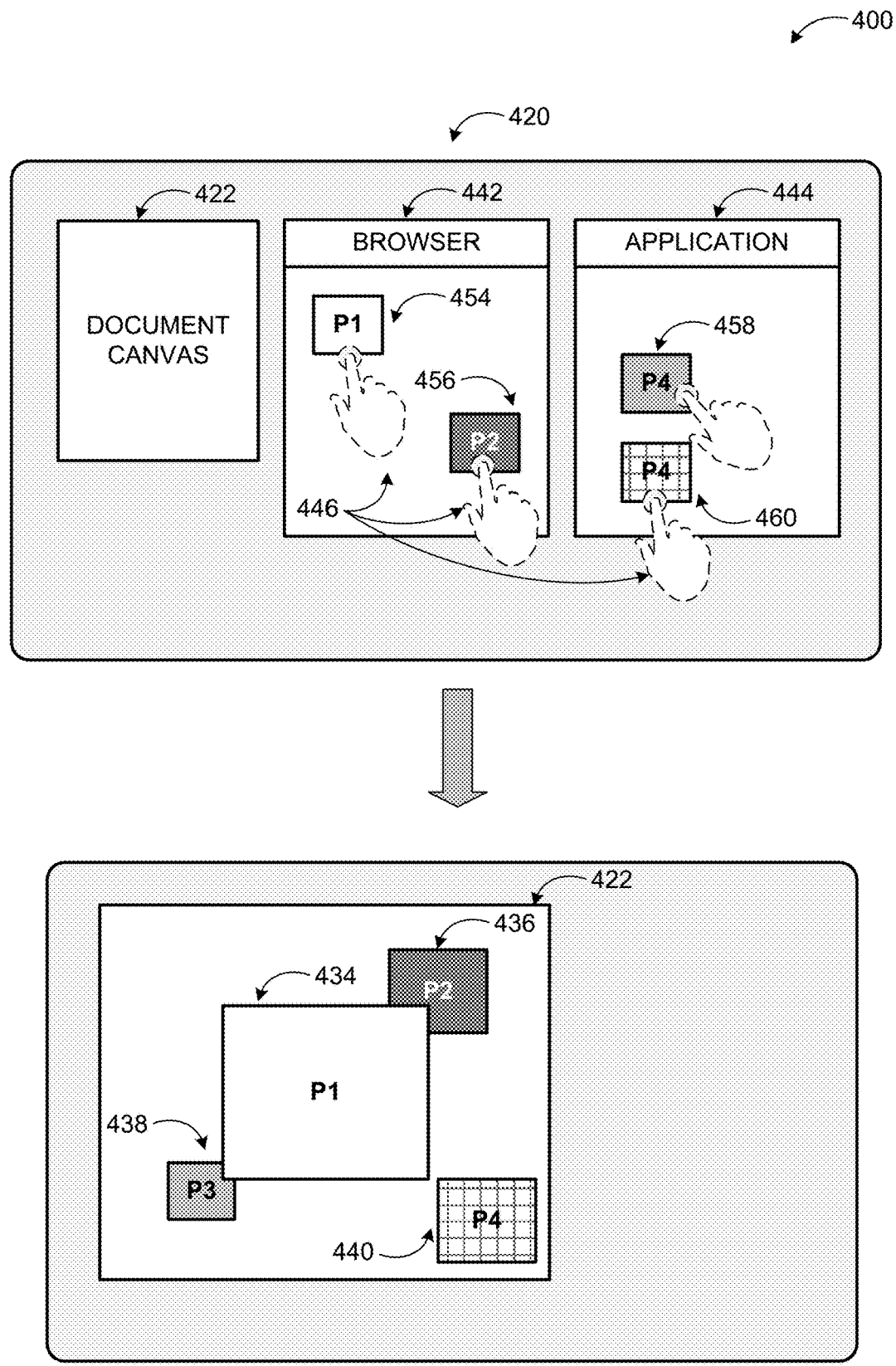
FIG. 4 illustrates another example for content selection and suggestion according to other examples.

Referring to FIG. 4, diagram 400 illustrates another example for content selection and suggestion according to other examples.

Diagram 400 shows an author selection or interest on content elements on a computing device 420 from different application user interfaces similar to that in FIG. 3. For example, the author may show interest in content elements 454 and 465 on the computing device 420 from a browser 442 and content elements 458 and 460 on an application 444 through selection 446 or comparable action.

Upon detecting of selection (446) of content elements 454 and 456 on the browser 442 and upon detection of selection (446) of content elements 458 and 460 on the application 444, the authoring application may automatically adjust/set attributes (i.e., size, order, etc.) of the content elements and place them according to a layout based on the determined author intent on the document canvas 422 as laid out content elements 434, 436, 438, and 440. At any point in the process, the author may be enabled to accept or reject suggested actions.

In some examples, galleries may be provided based on multiple properties of content/content elements making changes directly on user content (not example content). Furthermore, portions of content may be connected based on the author intent. For example, legal warnings may be connected to a product description and consumers prevented from modifying or deleting those.

In yet other examples, author intent may be determined by inference (i.e., "edu" domain for the collaborative team may indicate and educational institution). Styles and other changes may be suggested to the author(s) based on content (i.e., scholarly article, marketing brochure, and so on). While style and format changes typically apply to textual content, similar adjustments may also be performed on other types of content. For example, size, location, coloring, shading, etc. of images or graphics, controls presented for embedded objects (i.e., play controls for audio or video objects) may be selected/modified for consistency with the determined/inferred author intent.

Figure 5:
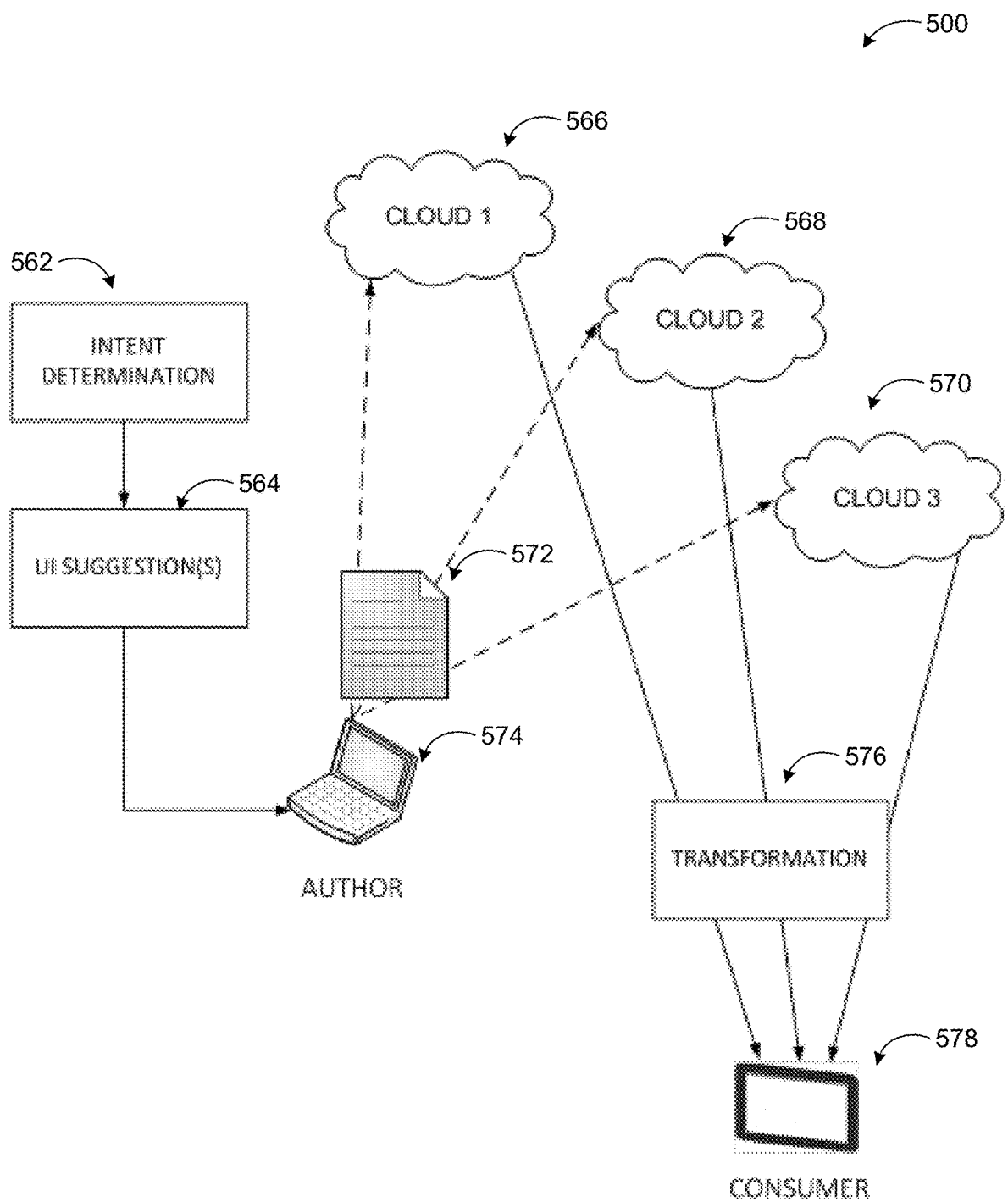
FIG. 5 illustrates an example for content transformation after creation by author based on consumer and/or consumer intent.

FIG. 5 illustrates an example for content transformation after creation by author based on consumer and/or consumer intent according to some examples.

According to some examples, transformation of the created content may be enabled based on a consumer attribute and/or a consumer intent subsequent to publication of the content to potential consumers of the content. In diagram 500, an author may create a single document (as described above) and store the document in a cloud. As different consumers of the document retrieve the document, the cloud, a server, a hosted service, even a local application on consumer computer may transform the document based on consumer attributes/the author intent. For example, the author may create a marketing document for a product. Once the document is made available to others, content and attributes of content may be adjusted based on who consumes the marketing document. For a customer, the document may be provided in full color; for a sales person, the document may be provided with or without color and with additional specification details; and for an engineer, the technical specifications in the marketing document may be emphasized.

In the example configuration of diagram 500, following intent determination 562 and presentation of content action suggestions 564 on the user interface of an authoring application, the author working on computing device 574 may create document 572. Document 572 may be published to one or more clouds 566, 568, and 570. Upon request by a consumer 578 of the published document, the document may be transformed (576) based on the consumer and/or consumer's intent and provided to the consumer. The transformation may be performed by each cloud separately or by a transformation service/application collectively for all clouds.

The examples in FIG. 1 through 5 have been described with specific user interface elements, configurations, and presentations. Examples are not limited to systems according to these example configurations. Intent based authoring may be implemented in configurations using other types of user interface elements, presentations, and configurations in a similar manner using the principles described herein.

Figure 6:
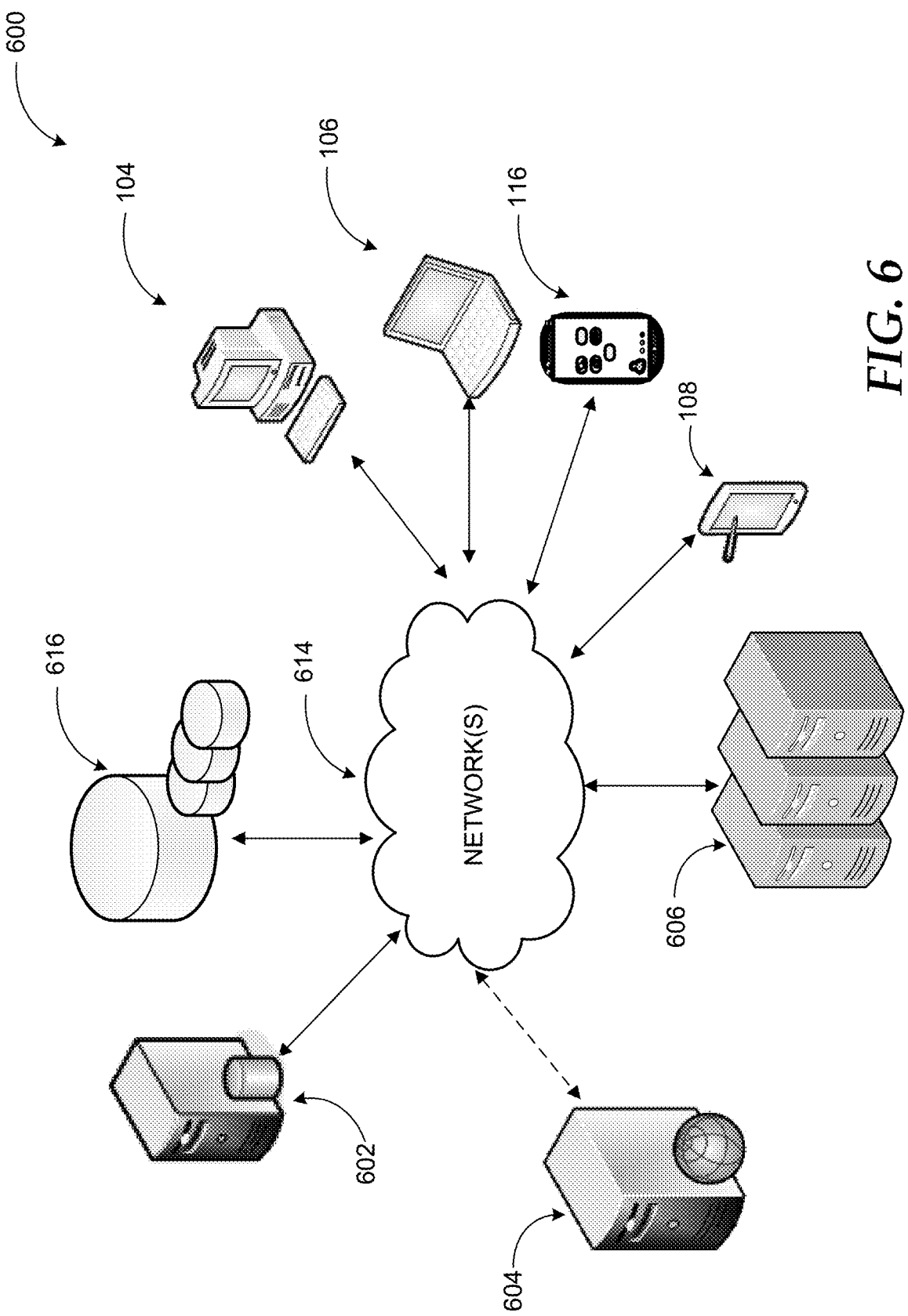
FIG. 6 is a networked environment, where a system according to examples may be implemented.

FIG. 6 is an example networked environment, where a system according to examples may be implemented. According to diagram 600, a system determining author intent and providing suggestions for content creation based on the author intent as well as content transformation following creation of the content before consumption may be implemented via software executed over one or more servers 606 such as a hosted service. The platform may communicate with client applications on individual computing devices such as the desktop computer 104, laptop computer 106, smart phone 116, and tablet 108 ('client devices') through network(s) 614.

Client applications executed on any of the client devices may facilitate communications with hosted authoring applications executed on servers 606, or on individual server 604. An authoring application executed on one of the servers may facilitate determination of author intent, presentation of suggested content actions, and implementation of selected content actions as discussed above. The authoring application may retrieve relevant data from data store(s) 616 directly or through database server 602, and provide requested services to the user(s) through the client devices.

Network(s) 614 may comprise any topology of servers, clients, Internet service providers, and communication media. A system according to examples may have a static or dynamic topology. Network(s) 614 may include secure networks such as an enterprise network, an unsecure network such as a wireless open network, or the Internet. Network(s) 614 may also coordinate communication over other networks such as Public Switched Telephone Network (PSTN) or cellular networks. Furthermore, network(s) 614 may include short range wireless networks such as Bluetooth or similar ones. Network(s) 614 provide communication between the nodes described herein. By way of example, and not limitation, network(s) 614 may include wireless media such as acoustic, RF, infrared and other wireless media.

Many other configurations of computing devices, applications, data sources, and data distribution systems may be employed to implement a platform responsive to individual user intent and directed to providing content action suggestions based on user intent. Furthermore, the networked environments discussed in FIG. 6 are for illustration purposes only. Examples are not limited to the example applications, modules, or processes.

Figure 7:
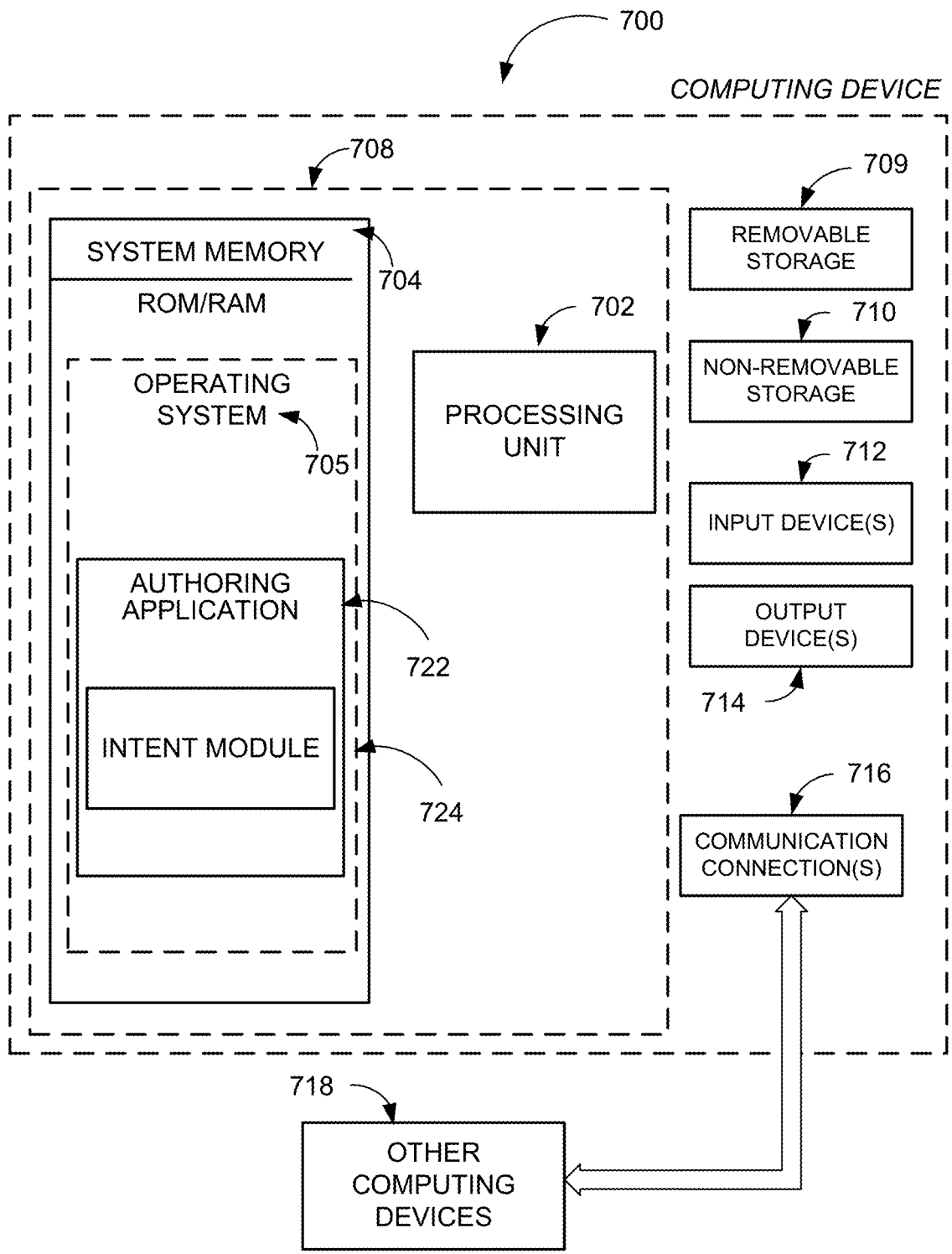
FIG. 7 is a block diagram of an example computing operating environment, where examples may be implemented.

FIG. 7 and the associated discussion are intended to provide a brief, general description of a suitable computing environment in which examples may be implemented. With reference to the device 700 of FIG. 7, a block diagram of an example computing operating environment for an application according to examples is illustrated, such as the computing device. In a basic configuration, computing device 700 may be any computing device with communication capabilities, and include at least one processing unit 702 and a system memory 704. The computing device 700 may also include the at least one processing unit 702 that cooperate in executing programs. Depending on the exact configuration and type of computing device, a system memory 704 may be volatile (such as RAM), non-volatile (such as ROM, flash memory, etc.) or some combination of the two. The system memory 704 typically includes an operating system 705 suitable for controlling the operation of the platform, such as the WINDOWS®, WINDOWS MOBILE®, or WINDOWS PHONE® operating systems from MICROSOFT CORPORATION of Redmond, Wash. The system memory 704 may also include one or more software applications such as the authoring application 722 and intent module 724.

The authoring application 722 may determine through the intent module 724 an author's intent based on a number of factors associated with the author, the content being created, and an environment. The authoring application 722 may then provide suggestions for various content actions as described herein. The authoring application 722 and the intent module 724 may be separate applications or integrated modules of a hosted service. This basic configuration is illustrated in FIG. 7 by those components within a dashed line 708.

The computing device 700 may have additional features or functionality. For example, the computing device 700 may also include additional data storage devices (removable storage 709 and/or non-removable storage 710) such as, for example, magnetic disks, optical disks, or tape. Such additional storage is illustrated in FIG. 7 by an output device 714 and a communication connection 716. An example of the output device 714 may include a display, such as a user interface. Computer readable storage media may include volatile and nonvolatile, removable and non-removable media implemented in any method or technology for storage of information, such as computer readable instructions, data structures, program modules, or other data. The system memory 704, the removable storage 709 and the non-removable storage 710 are all examples of computer readable memory device. Computer readable memory devices include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by the computing device 700. Any such computer readable storage media may be part of the computing device 700. The computing device 700 may also have the input device(s) 712 such as keyboard, mouse, pen, voice input device, touch input device, an optical capture device for detecting gestures, and comparable input devices. An output device(s) 714 such as a display, speakers, printer, and other types of output devices may also be included. These devices are well known in the art and need not be discussed at length here.

Some examples may be implemented in a computing device that includes a communication module, a memory device, and a processing unit, where the processing unit executes a method as described above or comparable ones in conjunction with instructions stored in the memory device. Other examples may be implemented as a computer readable memory device with instructions stored thereon for executing a method as described above or similar ones. Examples of memory devices as various implementations of hardware are discussed above.

The computing device 700 may also contain communication connections 716 that allow the device to communicate with other computing devices 718, such as over a wired or wireless network in a distributed computing environment, a satellite link, a cellular link, a short range network, and comparable mechanisms. The other computing devices 718 may include computer device(s) that execute communication applications, web servers and the comparable device. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example examples also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
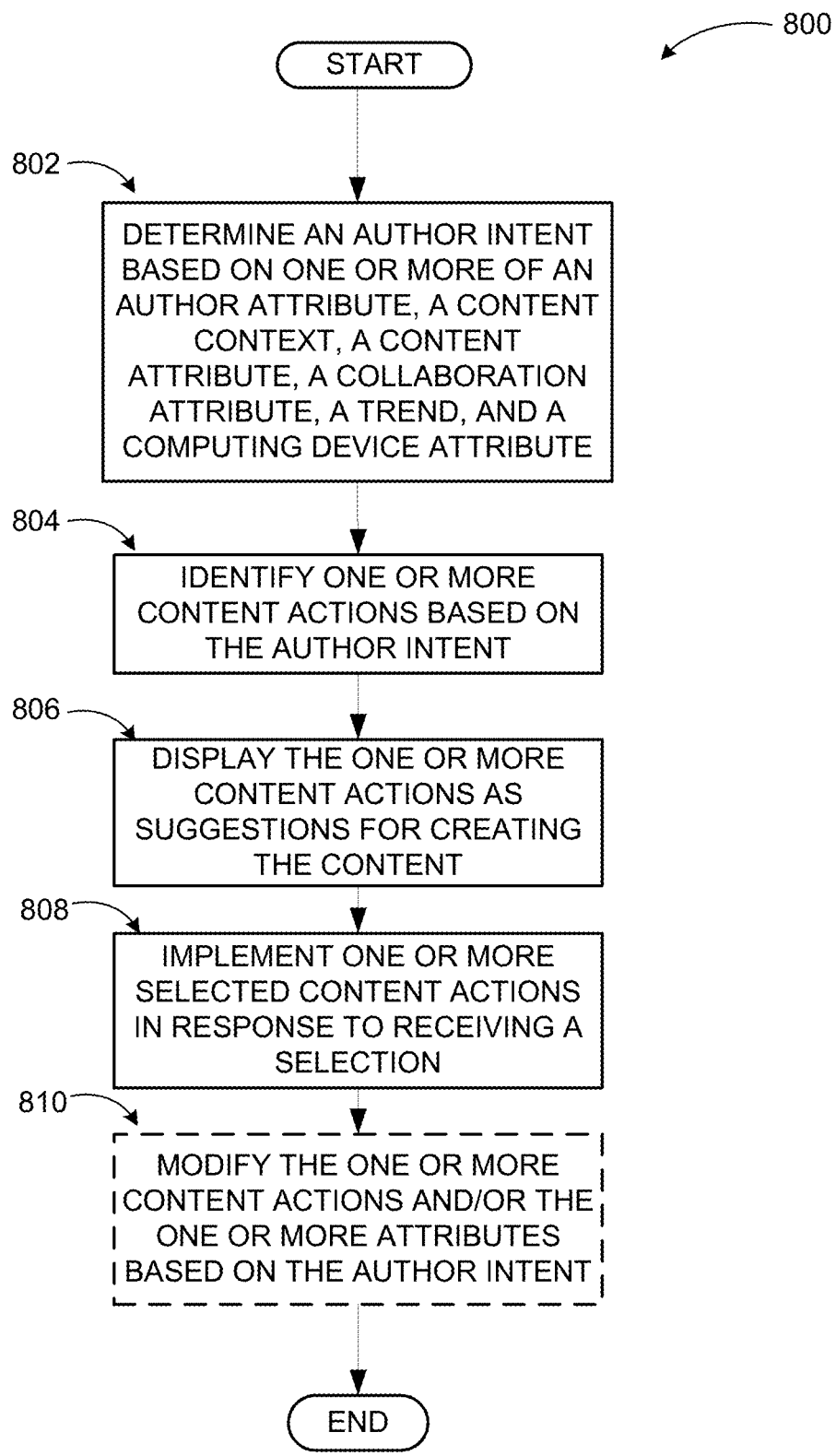
FIG. 8 illustrates a logic flow diagram for a process of enabling authoring content with suggestions based on author intent according to examples.

FIG. 8 illustrates a logic flow diagram for a process 800 of enabling authoring content with suggestions based on author intent according to examples. The process 800 may be implemented on a server or other computing device.

The process 800 begins with an operation 802, where author intent may be determined based on author's attributes, a document context, a collaboration information, document attributes, trends (i.e., crowd sourcing), and/or a computing device attribute. At operation 804, content actions such as placement, formatting, style, or layout of content may be determined based on the author intent. Furthermore, relationships, sizes, animations associated with, motion paths, and attributes of content elements may also be determined based on the author intent.

At operation 806, the determined content actions may be suggested to the author enabling the author to see how the content looks if a suggested content action is selected. At operation 808, selected content actions may be implemented.

At optional operation 810, created content may be modified (transformed) based on a type of consumer or an intent of a consumer of the content. For example, a medical report authored by a doctor may be stored in the cloud and made available to a broad audience. If a consumer of the report is an academician, content may be provided differently compared to if the reader is a lay person.

The operations included in the process 800 are for illustration purposes. Intent based authoring may be implemented by similar processes with fewer or additional steps, as well as in different order of operations using the principles described herein.

A means for creation of content through author intent based suggestions in a computing device may include a means for determining an author intent based on one or more of an author attribute, a content context, a content attribute, a collaboration attribute, a trend, and a computing device attribute; a means for identifying one or more content actions based on the author intent; a means for displaying the one or more content actions as suggestions for creating the content; and a means for implementing one or more selected content actions in response to receiving a selection.

According to some examples, methods for creation of content through author intent based suggestions in a computing device are provided. An example may include determining an author intent based on one or more of an author attribute, a content context, a content attribute, a collaboration attribute, a trend, and a computing device attribute. The example method may also include identifying one or more content actions based on the author intent, displaying the one or more content actions as suggestions for creating the content, implementing one or more selected content actions in response to receiving a selection, and displaying the one or more content actions in an implemented mode such that the author views each content action as performed. In some examples, the method may further include displaying the one or more content actions in galleries based on multiple properties of the content and content elements by applying changes directly on the content.

According to further examples, determining the author intent may include analyzing one or more of an organizational position of the author, a professional status of the author, an identity of the author, a social status of the author, a storage location of the content, one or more documents related to the content, one or more prior versions of the content, a type of the content, a restriction imposed on the content, and one or more modifications on the content. According to additional examples, determining the author intent may further include analyzing one or more of collaborators, a collaboration project, a type of computing device associated with the author, a trend among peers of the author, an organizational norm, and a trend in the Internet.

According to some examples, identifying the content actions includes determining one or more of a placement of the content, a formatting of the content, a style of the content, one or more relationships between content elements, a size of one or more content elements, an attribute of one or more content elements, a layout of the content elements, an animation associated with the one or more content elements, and a motion path for the one or more content elements. According to other examples, identifying the content actions further includes determining one or more accessibility options.

According to additional examples, the method may further include replacing one or more content portions with each other to emphasize the determined author intent. In some examples, the content portions may include text, an image, a graphic, and an embedded object.

According to some examples, computing devices for creating content through author intent based suggestions are described. An example computing device may include a memory, a display, and a processing unit coupled to the memory and the display. The processing unit may execute an authoring application. The authoring application may be configured to determine an author intent based on one or more of an author attribute, a content context, a content attribute, a collaboration attribute, a trend, and a computing device attribute. The authoring application may additionally be configured to identify one or more content actions based on the author intent, display the one or more content actions as suggestions to create the content in an implemented mode such that the author views each content action as performed, and implement one or more selected content actions in response to receiving a selection.

In further examples, the authoring application may be configured to enable transformation of the created content based on one or more of a consumer attribute and a consumer intent subsequent to publication of the content to potential consumers of the content. In some examples, the transformation may be performed at one or more of a cloud storing the created content, a hosted application providing access to the created content, and a local application associated with a consumer of the content.

In additional examples, the authoring application may be further configured to connect one or more portions of the content such that a consumer of the created content is prevented from one of modifying and deleting the connected portions of the content. In some examples, the content actions may include one or more of a placement of the content, a formatting of the content, a style of the content, one or more relationships between content elements, a size of one or more content elements, an attribute of one or more content elements, a layout of the content elements, an animation associated with the one or more content elements, a motion path for the one or more content elements, one or more accessibility options, and a replacement of two or more content portions.

In additional examples, the author may be enabled to interact with the authoring application through one or more of a touch input, a gesture input, a keyboard input, a mouse input, a pen input, a voice command, and an eye tracking input. In further examples, the authoring application may include one a locally installed application and a hosted service, and the computing device is one of: a server, a desktop computer, a laptop computer, a tablet, a smart whiteboard, and a smart phone.

According to some examples, computer-readable memory devices with instructions stored thereon to create content through author intent based suggestions are described. Example instructions of a computer-readable memory device may include determining an author intent based on one or more of an author attribute, a content context, a content attribute, a collaboration attribute, a trend, and a computing device attribute, identifying one or more content actions based on the author intent, displaying the one or more content actions as suggestions to create the content in an implemented mode such that the author views each content action as performed, implementing one or more selected content actions in response to receiving a selection, and enabling transformation of the created content based on one or more of a consumer attribute and a consumer intent subsequent to publication of the content to potential consumers of the content.

In additional examples, the instructions may further include determining a theme of the content and emphasizing at least one portion of the content based on the determined theme employing one or more of a textual scheme, a graphic scheme, a shading scheme, a placement scheme, and a color scheme.

In some examples, enabling transformation of the content includes enabling modification of one or more of the created content, an attribute of the created content, and an attribute of a content element. In other examples, the instructions may further include employing a learning algorithm to dynamically adjust intent determination and content action identification.

The above specification, examples and data provide a complete description of the manufacture and use of the composition of the examples. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and examples.

What is claimed is:

1. A method to be executed in a computing device to create content through author intent based suggestions, the method comprising:
   determining, via an intent module, an author intent by analyzing one or more of an author attribute, a content context, a content attribute, a collaboration attribute, a trend, and a computing device attribute;
   identifying, via the authoring application, one or more content actions;
   determining an order of importance of each of the one or more content actions based at least on the author intent;
   displaying, via the authoring application and in the order of importance, the one or more content actions as suggestions for creating the content;
   automatically implementing, via the authoring application, a first content action having a highest importance with respect to the order of importance in a middle position within the content, where the first content action has an enlarged size relative to a second content action having a lower importance than the first content action; and
   automatically implementing, via the authoring application and based at least on a position of the second content action in the order of importance, the second content action in an overlap position and behind the first content action.

2. The method of claim 1, further comprising:
   displaying the one or more content actions in an implemented mode such that the author views each content action as performed.

3. The method of claim 1, further comprising:
   displaying the one or more content actions in galleries based on multiple properties of the content and content elements by applying changes directly on the content.

4. The method of claim 1, wherein determining the author intent comprises analyzing one or more of an organizational position of the author, a professional status of the author, an identity of the author, a social status of the author, a storage location of the content, one or more documents related to the content, one or more prior versions of the content, a type of the content, a restriction imposed on the content, and one or more modifications on the content.

5. The method of claim 4, wherein determining the author intent further comprises analyzing one or more of collaborators, a collaboration project, a type of computing device associated with the author, a trend among peers of the author, an organizational norm, and a trend in the Internet.

6. The method of claim 1, wherein identifying the content actions comprises determining one or more of a placement of the content, a formatting of the content, a style of the content, one or more relationships between content elements, a size of one or more content elements, an attribute of one or more content elements, a layout of the content elements, an animation associated with the one or more content elements, and a motion path for the one or more content elements.

7. The method of claim 6, wherein identifying the content actions further comprises determining one or more accessibility options.

8. The method of claim 1, further comprising:
replacing one or more content portions with each other to emphasize the determined author intent.

9. The method of claim 8, wherein the content portions include text, an image, a graphic, and an embedded object.

10. A method for creating content through author intent based suggestions using an authoring application implemented on a computing device, the method comprising:
determining, via an intent module of the authoring application, an author intent by analyzing one or more of one or more author attributes, a content context, a content attribute, a collaboration attribute, a trend, and a computing device attribute, where the one or more author attributes include at least an organizational position of the author, a professional status of the author, and an identity of the author;
identifying, via the intent module of the authoring application, one or more content actions based at least on the author intent;
displaying, via the authoring application, the one or more content actions as suggestions to create the content in an implemented mode such that each content action is performed in an order based on the author intent;
via the intent module of the authoring application, determining an importance for each of the one or more content actions based on a type of the content, where at least one of the one or more content actions has a highest importance with respect other content actions of the one or more content actions; and
automatically implementing at least the one of the one or more content actions in a middle position within the content, where the one of the one or more content actions has an enlarged size relative to another content action of the one or more content actions.

11. The method of claim 10, further comprising enabling transformation of the created content based on one or more of a consumer attribute and a consumer intent subsequent to publication of the content to potential consumers of the content.

12. The method of claim 11, wherein the transformation is performed at one or more of a cloud storing the created content, a hosted application providing access to the created content, and a local application associated with a consumer of the content.

13. The method of claim 10, further comprising connecting one or more portions of the content such that a consumer of the created content is prevented from one of modifying and deleting the connected portions of the content.

14. The method of claim 10, wherein the content actions include one or more of a placement of the content, a formatting of the content, a style of the content, one or more relationships between content elements, a size of one or more content elements, an attribute of one or more content elements, a layout of the content elements, an animation associated with the one or more content elements, a motion path for the one or more content elements, one or more accessibility options, and a replacement of two or more content portions.

15. The method of claim 10, wherein the author is enabled to interact with the authoring application through one or more of a touch input, a gesture input, a keyboard input, a mouse input, a pen input, a voice command, and an eye tracking input.

16. The method of claim 10, wherein the authoring application is one of a locally installed application and a hosted service, and the computing device is one of: a server, a desktop computer, a laptop computer, a tablet, a smart whiteboard, and a smart phone.

17. A non-transitory computer-readable memory device with instructions stored thereon to create content through author intent based suggestions, the instructions comprising:
determining, via an intent module of an authoring application, an author intent by at least partially integrating one or more author attributes, a content context, a content attribute, a collaboration attribute, a trend, and a computing device attribute, where the one or more author attributes include at least an organizational position of the author, a professional status of the author, and an identity of the author;
identifying, via the intent module of the authoring application, one or more content actions using the author intent;
displaying, via the authoring application, the one or more content actions as suggestions to create the content in an implemented mode such that each content action is performed in an order based on the author intent;
determining a theme of the content being created by the author;
automatically implementing, via the authoring application, at least one of the one or more content actions by creating a title or header to be placed within the content based on the determined theme of the content, where the one of the one or more content actions has a highest importance relative to other content actions of the one or more content actions; and
enabling transformation of the created content based on one or more of a consumer attribute and a consumer intent subsequent to publication of the content to potential consumers of the content.

18. The non-transitory computer-readable memory device of claim 17, wherein the instructions further comprise emphasizing at least one portion of the content based on the determined theme further employing one or more of a textual scheme, a graphic scheme, a shading scheme, a placement scheme, and a color scheme.

19. The non-transitory computer-readable memory device of claim 17, wherein enabling transformation of the content comprises enabling modification of one or more of the created content, an attribute of the created content, and an attribute of a content element.

20. The non-transitory computer-readable memory device of claim 17, wherein the instructions further comprise employing a learning algorithm to dynamically adjust intent determination and content action identification.

* * * * *